US009272938B2

(12) United States Patent
Flynn

(10) Patent No.: US 9,272,938 B2
(45) Date of Patent: Mar. 1, 2016

(54) SPLIT LOADING FUNNEL FOR CHARGING A MOLTEN GLASS GOB INTO A BLANK MOLD

(71) Applicant: Owens-Brockway Glass Container Inc., Perrysburg, OH (US)

(72) Inventor: Robin L Flynn, Waterville, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 39 days.

(21) Appl. No.: 14/134,777

(22) Filed: Dec. 19, 2013

(65) Prior Publication Data

US 2015/0175465 A1 Jun. 25, 2015

(51) Int. Cl.
*C03B 9/16* (2006.01)
*C03B 7/00* (2006.01)
*C03B 7/088* (2006.01)
*C03B 9/13* (2006.01)
*C03B 7/16* (2006.01)

(52) U.S. Cl.
CPC . *C03B 7/088* (2013.01); *C03B 7/16* (2013.01); *C03B 9/13* (2013.01)

(58) Field of Classification Search
CPC ........ C03B 9/165; C03B 7/16; C03B 9/3866; C03B 7/08; C03B 7/18; C03B 7/084; C03B 7/088
USPC ................ 65/72, 82, 158, 127, 207, 303–304
See application file for complete search history.

(56) References Cited

U.S. PATENT DOCUMENTS

| 2,010,334 | A | | 8/1935 | Stewart | |
|---|---|---|---|---|---|
| 3,216,813 | A | | 11/1965 | Mumford | |
| 3,445,218 | A | | 5/1969 | Trudeau | |
| 3,586,494 | A | | 6/1971 | Mumford | |
| 3,672,860 | A | * | 6/1972 | Keller | 65/208 |
| 3,857,691 | A | * | 12/1974 | Jones et al. | 65/303 |
| 3,893,835 | A | | 7/1975 | Jones et al. | |
| 4,271,212 | A | * | 6/1981 | Stengle | 427/203 |
| 4,367,088 | A | * | 1/1983 | Belletti | 65/234 |
| 4,379,715 | A | | 4/1983 | Garza | |
| 4,466,821 | A | | 8/1984 | Irwin et al. | |
| 5,394,910 | A | | 3/1995 | Sweetland | |
| 5,599,370 | A | * | 2/1997 | Struckmeier et al. | 65/207 |
| 5,746,798 | A | | 5/1998 | Menzie | |
| 5,917,106 | A | * | 6/1999 | Cirincione et al. | 65/122 |
| 6,038,888 | A | * | 3/2000 | Flynn et al. | 65/304 |
| 6,477,862 | B1 | * | 11/2002 | Wacke | 65/29.14 |
| 8,117,869 | B2 | * | 2/2012 | Fenton | 65/229 |
| 8,166,779 | B2 | | 5/2012 | Mohr | |
| 2007/0251274 | A1 | * | 11/2007 | Fenton | 65/357 |
| 2011/0247363 | A1 | * | 10/2011 | Dalstra | 65/29.1 |

OTHER PUBLICATIONS

PCT Int. Search Report and Written Opinion, Int. Serial No. PCT/US2014/070352, Int. Filing Date: Dec. 15, 2014, Applicant: Owens-Brockway Glass Container Inc., Mail Date: Mar. 26, 2015.

* cited by examiner

*Primary Examiner* — Jodi C Franklin

(57) ABSTRACT

A split loading funnel includes two or more individual funnel segments, each of which includes an interior guide surface. The two or more individual funnel segments are arranged relative to one another so that interior guide surfaces of the individual funnel segments cooperate to define a guide passage having a longitudinal axis. An apparatus that includes a split loading funnel and a process for delivering a gob of molten glass from a gob delivery system into a blank mold using a split loading funnel are also disclosed.

13 Claims, 8 Drawing Sheets

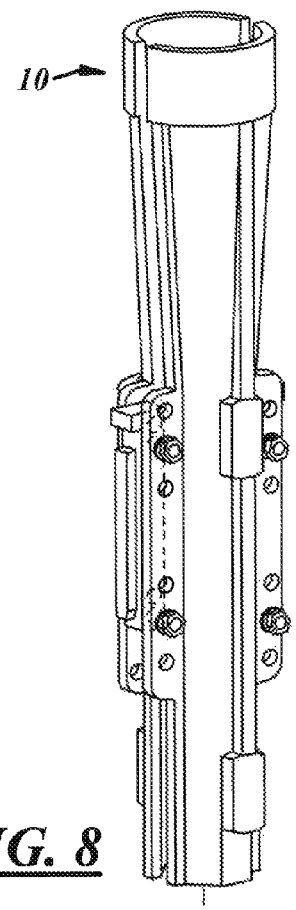
FIG. 8
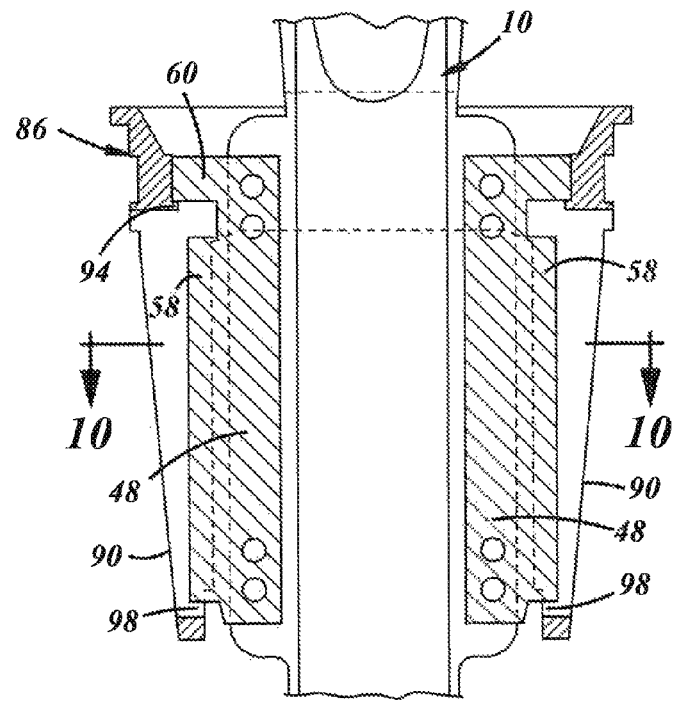
FIG. 9
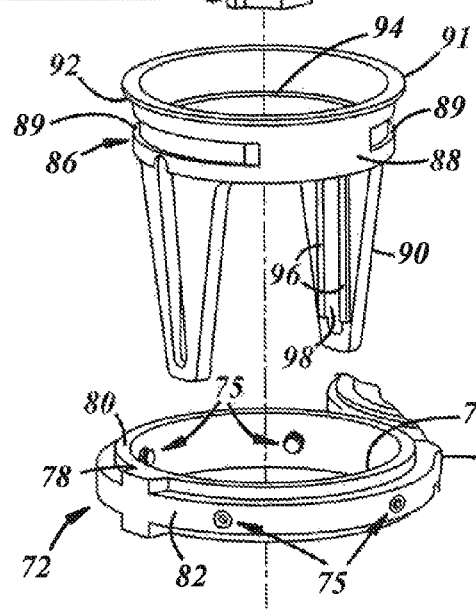
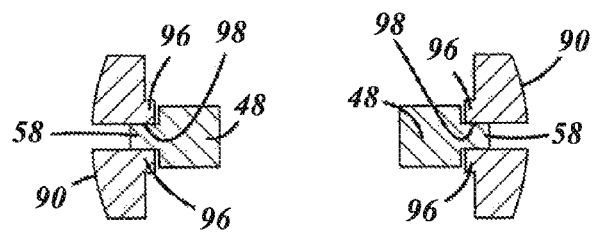
FIG. 10

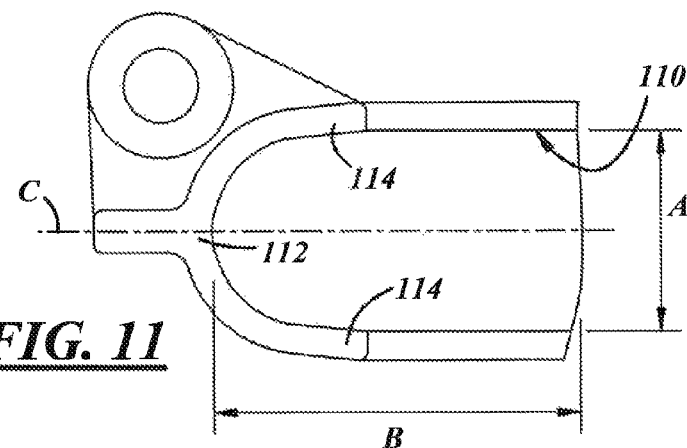
FIG. 11
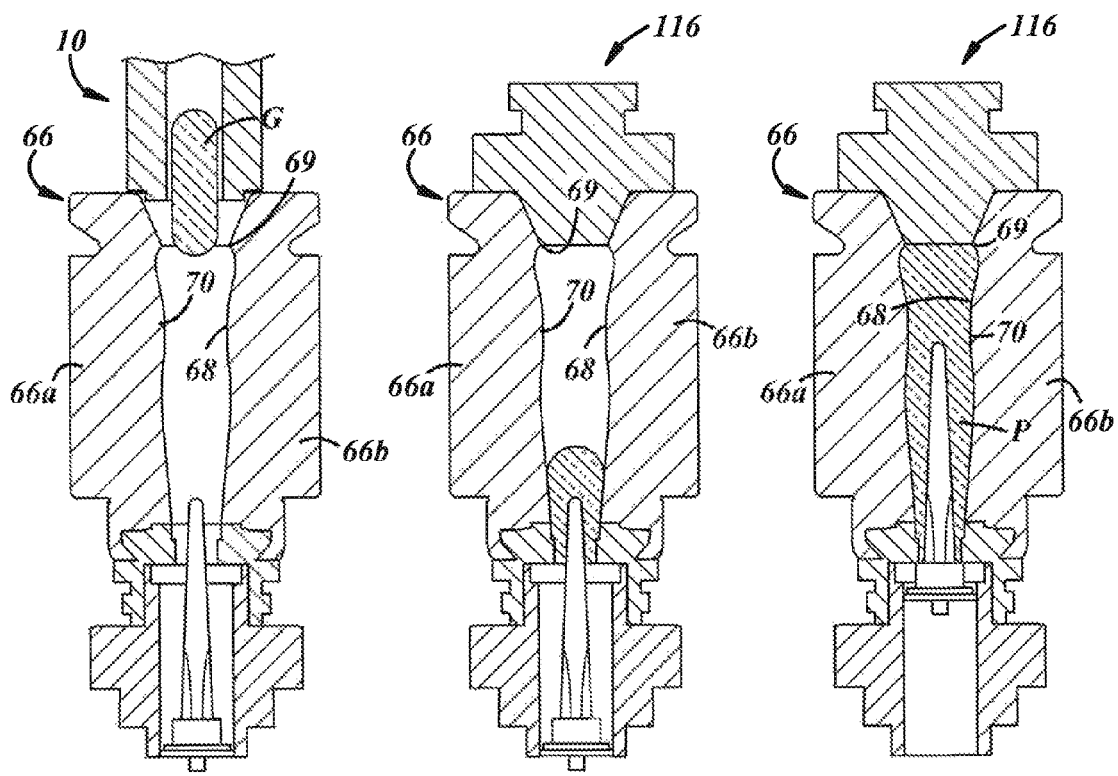
FIG. 12A  FIG. 12B  FIG. 12C

SPLIT LOADING FUNNEL FOR CHARGING A MOLTEN GLASS GOB INTO A BLANK MOLD

The present disclosure is directed to an apparatus for glassware manufacturing and, more particularly, to loading funnels for charging gobs of molten glass to blank molds.

BACKGROUND AND SUMMARY OF THE DISCLOSURE

Loading funnels for delivering a gob of molten glass from a gob delivery system into a blank mold of an individual section glass container forming machine are generally known in the art. One type of conventional loading funnel includes a flared entrance section for receiving the gob from the gob delivery system and a tubular shaping section situated downstream from the flared entrance section for shaping the gob and guiding it into the opening of the blank mold. The tubular shaping section is generally smaller in cross-sectional area than the gob that passes through it. A U.S. patent that describes such a loading funnel is U.S. Pat. No. 5,917,106. Another conventional type of loading funnel is described U.S. Pat. No. 3,672,860. Conventional loading funnels require swabbing with a glass release coating.

A general object of the present disclosure, in accordance with one aspect of the disclosure, may include providing a split loading funnel that can deliver gobs of molten glass from a gob delivery system into an aligned blank mold by way of a guide passage. The split loading funnel is formed from two or more funnel segments that may provide for variability in the size and shape of the guide passage. This variability may make accurate and gentle delivery of molten glass gobs to the blank mold less complex across a wide range of process variances and may reduce or eliminate the need for swabbing. The present disclosure embodies a number of aspects that can be implemented separately from, or in combination with, each other.

A split loading funnel in accordance with one aspect of the disclosure includes two or more individual funnel segments, each of which includes an interior guide surface. The two or more individual funnel segments are arranged relative to one another so that the interior guide surfaces of the individual funnel segments cooperate to define a guide passage having a longitudinal axis. The guide passage, moreover, has a cross-sectional area that is larger than a cross-sectional area of a gob of molten glass.

In accordance with another aspect of the disclosure, there is provided an apparatus for delivering a gob of molten glass into a blank mold. The apparatus includes a loading funnel holder that defines at least one opening, and a split loading funnel carried by the funnel holder. The split loading funnel includes two or more individual funnel segments. Each funnel segment includes an interior guide surface. The individual funnel segments are arranged relative to one another so that their interior guide surfaces cooperate to define a guide passage having a longitudinal axis.

In accordance with yet another aspect of the disclosure, there is provided a process of delivering a gob of molten glass from a gob delivery system to a blank mold. The process involves providing an apparatus that includes a split, rotatable, loading funnel carried by a funnel holder. The funnel has two or more individual funnel segments. Those segments are arranged relative to one another to cooperatively define a guide passage that has a longitudinal axis. The process also includes locating the funnel above a mold cavity of a blank mold so that the guide passage of the funnel is vertically aligned with the mold cavity. Furthermore, the process includes delivering a gob of molten glass from a deflector to the mold cavity through the guide passage of the funnel. The funnel is moved away from the mold cavity once the gob has been introduced into the mold cavity for transformation into a glass parison as part of a glass container forming operation.

In accordance with yet another aspect of the disclosure, there is provided a glassware forming machine that includes a blank mold for forming a molten glass gob into a glass parison; and a funnel positioned above said blank mold for guiding molten glass gobs into said blank mold and circumferentially split to include segments, and blocks for adjusting the funnel segments with respect to each other.

BRIEF DESCRIPTION OF THE DRAWINGS

The disclosure, together with additional objects, features, advantages and aspects thereof, will be best understood from the following description, the appended claims and the accompanying drawings, in which:

FIG. 8 is an exploded perspective view of one of the split loading funnels depicted in the apparatus of shown in FIG. 7;

FIG. 9 is a cross-sectional view of the split loading funnel shown in FIG. 1 taken along line 9-9 of FIG. 1;

FIG. 10 is a cross-sectional view of the depending legs of the funnel mount and the received vertical guides of the mounting blocks taken along the line 10-10 in FIG. 9;

FIG. 11 is a cross-sectional view of one of the deflectors depicted in the gob delivery system illustrated in FIG. 7;

FIGS. 12A-12C are progressive cross-sectional views of one of the blank molds shown in FIG. 7, and illustrating delivery of a gob to the mold and formation of the gob into a parison;

DETAILED DESCRIPTION

A split loading funnel for delivering a gob of molten glass from a gob delivery system to a blank mold is disclosed. The split loading funnel may include two or more individual funnel segments, and it may be part of a larger apparatus that includes a plurality of funnels—either additional split loading funnels and/or conventional funnels—for delivering multiple gobs to multiple blank molds. Constructing the split loading funnel from multiple individual funnel segments introduces process flexibility that is generally not available in a conventional single-piece loading funnel, as will be further explained below.

Figure 1:
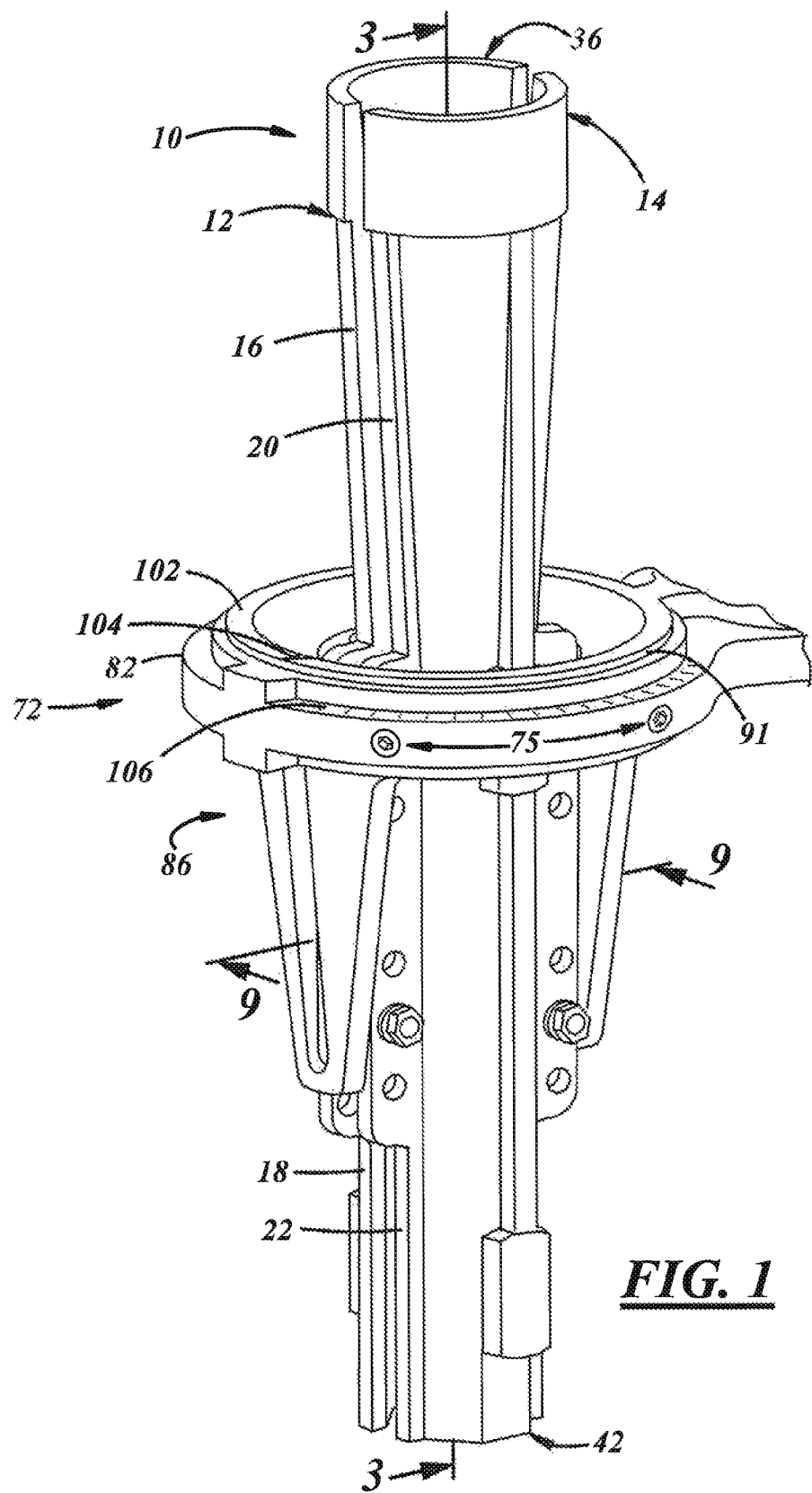
FIG. 1 is a perspective view of a split loading funnel in accordance with an illustrative embodiment of the present disclosure.

With reference to FIG. 1, an embodiment of a split loading funnel 10 includes a first funnel segment 12 and a second funnel segment 14. Accordingly, the funnel 10 is circumferentially split along its length into multiple segments 12, 14. The first funnel segment 12 has an upper portion 16 and a lower portion 18. Likewise, the second funnel segment 14 has an upper portion 20 and a lower portion 22.

Figure 2:
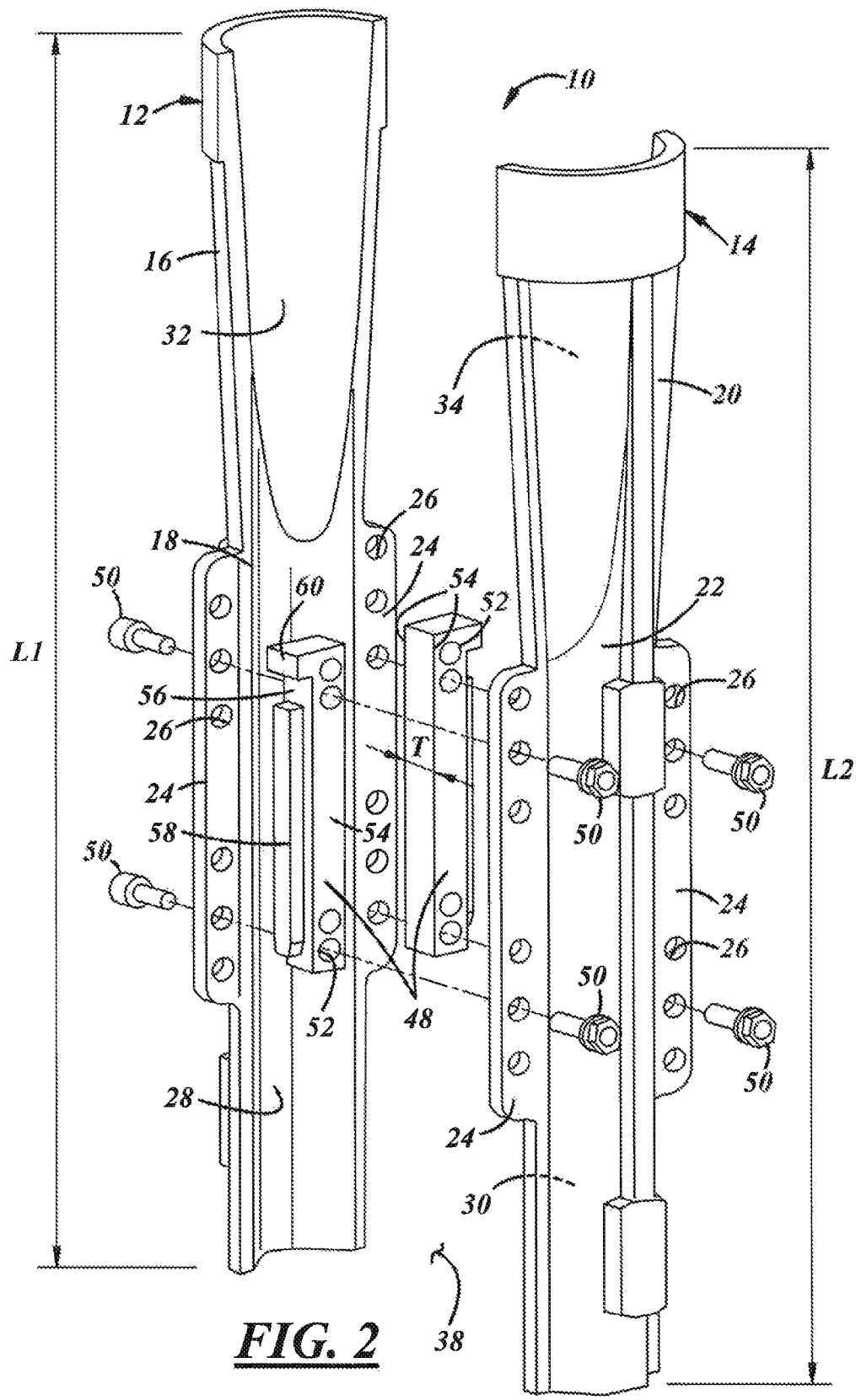
FIG. 2 is an exploded view of the split loading funnel shown in FIG. 1.

With reference to FIG. 2, the funnel segments 12, 14 additionally include lateral flanges 24 extending from sides of the segments 12, 14, for example, at the bottom portions 18, 22. The lateral flanges 24 may include holes 26 for carrying fasteners therethrough. Also, the first funnel segment 12 has a length L1 and the second funnel segment 14 has a length L2. The lengths L1, L2 of the funnel segments 12, 14 may, but do not have to, be the same, and may be about 10-12 inches in length or of any other suitable length suitable for a given application.

The lower portions 18, 22 of the funnel segments 12, 14 have concave interior guide surfaces 28, 30. These surfaces 28, 30 can have any desirable cross-sectional profile including, for example, semi-circular, triangular, frusto-conical, or rectangular, to name but a few. In any case, the surfaces 28, 30 may establish an inscribed diameter through which a glass gob falls.

Figure 3:
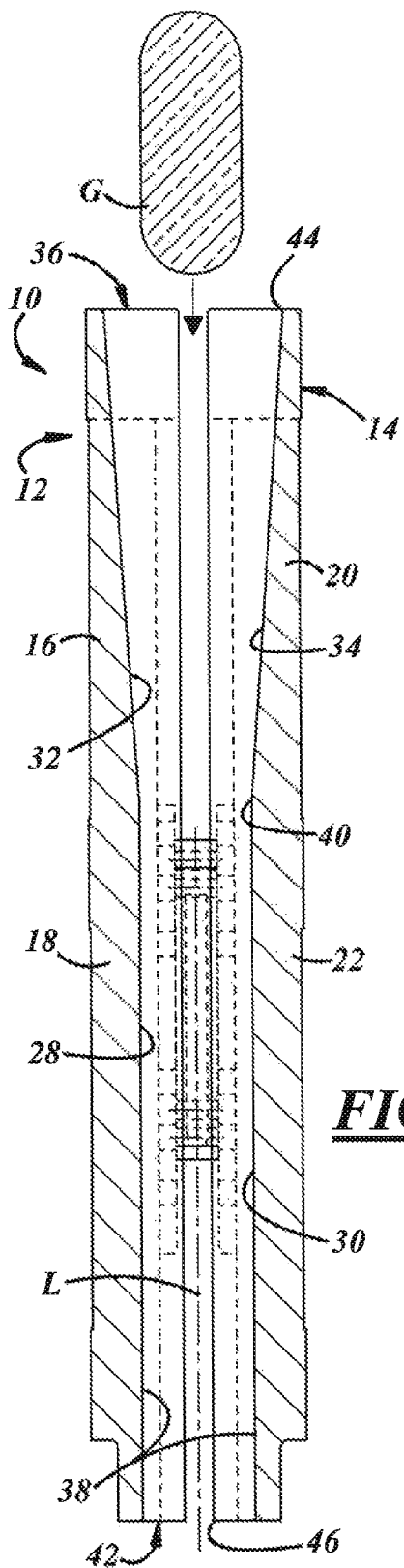
FIG. 3 is a cross-sectional view of the split loading funnel shown in FIG. 1 taken along line 3-3 of FIG. 1.

With respect to FIG. 3, the upper portions 16, 20 of the funnel segments 12, 14 have concave interior surfaces 32, 34 that are angled outwardly relative to the interior guide surfaces 28, 30 at the angle illustrated within plus or minus 5 degrees, or at any other suitable angle. The upper portions 16, 20 typically constitute about 30-40% (e.g., about 35%) of the length L1, L2 of the funnel segments 12, 14 while the lower portions 18, 22 constitute the remaining portion of the length L1, L2.

The relative positioning of the funnel segments 12, 14 is arranged so that the concave interior surfaces 32, 34 of the upper portions 16, 20 provide an inlet 36 of the funnel 10 and the concave interior guide surfaces 28, 30 of the lower portions 18, 22 face one another to cooperatively provide a guide passage 38 extending from the inlet 36 to an outlet 42. The inlet 36 has an entrance plane 44 and the outlet has an exit plane 46, and the guide passage 38 has a longitudinal axis L that is generally co-linear with a flow direction of a molten glass gob G through the guide passage 38. The entrance plane 44 of the inlet 36, as shown here, preferably defines a cross-sectional area that is greater than a cross-sectional area of the guide passage 38. As used herein, the phrase "cross-sectional area" includes such areas extending perpendicularly with respect to the axis L.

With respect to FIG. 2, the funnel segments 12, 14 are coupled together in this embodiment by mounting blocks 48, and fasteners 50, for example, screws, bolts, and/or nuts. Accordingly, the funnel 10 may be circumferentially split and includes the segments 12, 14, and the blocks 48 for adjusting the segments 12, 14 with respect to each other. The blocks 48 may be generally rectangular, which as used herein, may include tapered surfaces such that the blocks may be somewhat wedge-shaped. The mounting blocks 48 are positioned between opposed confronting lateral flanges 24 of the two funnel segments 12, 14. One or more holes 52 are provided in opposed sides 54 of the blocks 48. These opposed sides 54 define a thickness T of the blocks 48. Accordingly, blocks 48 of different thicknesses can be used to change the inscribed diameter of the funnels 10. The holes 52 in the opposed sides 54 are aligned with one or more of the holes 26 of their associated lateral flanges 24. The fasteners 50 are received through the holes 26 in the lateral flanges 24 and into corresponding holes 52 of the interposed blocks 48. The holes 52 may be threaded for threaded engagement with the fasteners 50, or may be through passages, or may be of any other suitable configuration. The mounting blocks 48 further include radially outwardly-facing mounting surfaces 56 extending between the two side surfaces 54. The outwardly-facing mounting surfaces 56 of the blocks 48 include vertical tongues or guides 58 extending away from the mounting surfaces 56, and vertical stops 60 extending away from the mounting surfaces 56 and spaced above the guides 58.

The use of multiple funnel segments 12, 14 allows for the guide passage 38 of the split loading funnel 10 to be adjustable in size and shape. The cross-sectional shape of the guide passage 38 can be determined by coordinating the cross-sectional profiles of the facing interior guide surfaces 28, 30 as desired.

Figure 4:
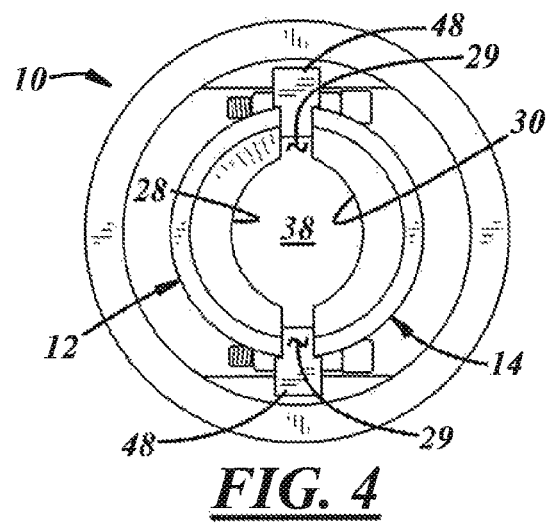
FIG. 4 is a top plan view of an embodiment of the split loading funnel shown in FIG. 1.

In a first example, shown in FIG. 4, the cross-sectional shape of the guide passage 38 can be rendered ovular (e.g, elliptical) by employing interior guide surfaces 28, 30 with semi-circular cross-sectional profiles. Also, because the segments 12, 14 are circumferentially spaced apart, there may be gaps 29 circumferentially therebetween and radially adjacent the blocks 48.

Figure 5:
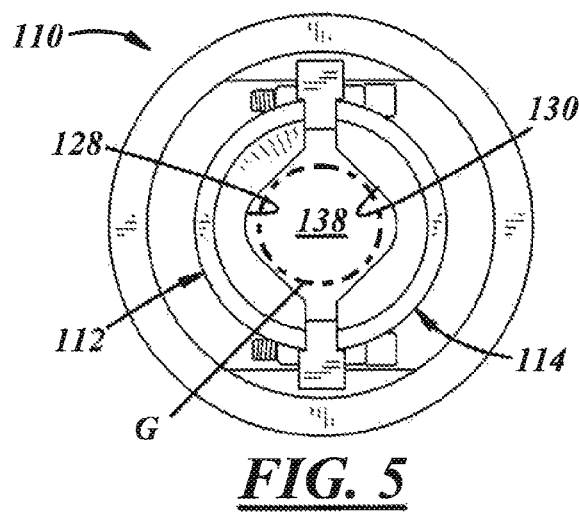
FIG. 5 is a top plan view of another embodiment of a split loading funnel.

In a second example, shown in FIG. 5, another funnel 110 may have a cross-sectional area of a guide passage 138 rendered generally rectangular by employing segments 112, 114 with interior guide surfaces 128, 130 having semi-rectangular cross-sectional profiles. Other cross-sectional guide passage shapes are possible.

Figure 6:
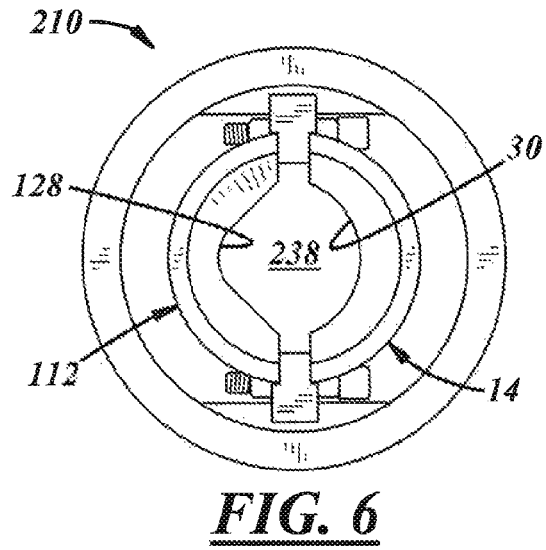
FIG. 6 is a top plan view of yet another embodiment of a split loading funnel.

In a third example, shown in FIG. 6, another funnel 210 may have a cross-sectional shape of a guide passage 238 rendered asymmetric by employing segments 112, 14 with interior guide surfaces 128, 30 that have different cross-sectional profiles, such as one semi-circular and one semi-rectangular, as shown. Accordingly, the funnel 210 may have at least two segments with opposed glass-contacting surfaces that are not mirror images of each other.

With respect to FIG. 2, the cross-sectional area of the guide passage 38 can be determined by the structure of the blocks 48 used to secure the funnel segments 12, 14 together. The thickness T of the blocks 48 sets the spacing between the funnel segments 12, 14 which, in turn, means that the cross-sectional area of the guide passage 38 as defined by the interior guide surfaces 28, 30 can be adjusted upwardly (thicker blocks) or downwardly (thinner blocks) within any suitable range by using different sized blocks 48. For example, blocks can be swapped out to change the inscribed diameter from 1" to 1¼" and vice-versa, or to and from any other suitable sizes.

The cross-sectional area of the guide passage 38 can also be rendered constant or variable. To achieve a constant sectional area down the guide passage 38, the blocks 48 can be provided with a uniform thickness. To achieve a variable sectional area down the guide passage 38, on the other hand, the thicknesses T of the blocks 48 can be tapered in a longitudinal direction to change the angle of the interior guide surfaces 28, 30 with respect to the longitudinal axis L. In another embodiment, the opposed confronting lateral flanges 24 of the two funnel segments 12, 14 instead or in addition may be tapered. In any event, it is, therefore, possible to progressively decrease the cross-sectional area of the guide passage 38 from the entrance plane 44 of the inlet 36 to the exit plane 46 of the outlet 42, or vice versa.

The cross-sectional area of the guide passage 38 may be at least slightly larger than a corresponding cross-sectional area of the molten glass gob G, for example as illustrated in FIG.

5. The cross-sectional areas may be generally perpendicular to the direction of travel of the gob G at any given location of the gob G as it travels through the passage 38. The larger-sized guide passage 38 is designed to accurately and gently guide the glass gob G into a bottom of a blank mold without the gob G contacting narrow portions of the mold and yet providing some tolerance for the gob G to grow, distort, or wiggle. The difference in size may be like that illustrated in FIG. 3, or of any other suitable difference.

Sizing the cross-sectional area of the guide passage 38 as just-described can help avoid certain problems commonly encountered with single-piece loading funnels. The limited ability to tolerate positive variances in the corresponding cross-sectional area of the gob G (i.e., gob growth) is one notable problem that may arise if the cross-sectional area of the guide passage of a single-piece loading funnel is the same size or smaller than the corresponding cross-sectional area of the gob G. Under such circumstances, the gob G would drag against the guide surface(s) of the guide passage, causing that surface to heat up. The heating of the guide surface(s) would exacerbate the drag forces and increase the probability that the guide passage would become plugged. If the guide passage became plugged, then maintenance must be performed to unplug the passage, which is labor-intensive and adversely affects manufacturing efficiency.

Sizing the cross-sectional area of the guide passage 38 to be larger than the corresponding cross-sectional area of the molten glass gob G also reduces or altogether eliminates the need to apply a lubricant to the interior guide surfaces 28, 30. A lubricant such as oil has conventionally been injected or swabbed periodically into a tubular guide passage of a single-piece loading funnel to alleviate gob drag and cool the guide passage surfaces. While the oil is helpful to some extent, it does not completely solve the gob plugging problem and has a tendency to create smoke around the working environment. It also adds complexity and expense to the gob loading process. Specifically allowing extra room for the gob G to grow and distort in the guide passage 38 of the split loading funnel 10 reduces the adverse effects associated with gob drag and generally makes the use of oil unnecessary.

Still further, the adjustability of the guide passage 38 allows selective orientation of the interior guide surfaces 28, 30 with the gob G. This can be helpful in dealing with recurring variances in the trajectory of the gob G as it travels from an exit of the deflector 108 (FIG. 7) to an entrance of a blank mold. It has been observed, for example, that that the trajectory of the gob G oftentimes varies more predominantly in one particular direction as it leaves the gob delivery system, as will be more fully explained below. For example, if the gob G has any horizontal velocity as it enters the blank mold, then it will hit the side of a cavity of the mold as it loads. Such interference may cause downstream quality concerns and may require the blank mold to be swabbed to mitigate or avoid such concerns. To accommodate this recurring variance in gob trajectory, the cross-sectional area of the guide passage 38 can be appropriately chosen and then oriented relative to the expected trajectory path of the gob G to more tightly control the direction in which trajectory variances are most commonly encountered. The guide passage 38 is preferably oriented so that the interior guide surfaces 28, 30 are perpendicular to the direction in which gob trajectory variances are anticipated.

The first and second funnel segments 12, 14 are preferably investment cast from steel, for example, stainless steel and, more specifically Type 304L stainless. The precise cross-sectional profile and general shape of the interior guide surfaces 28, 30 are derived from CNC (computer numerical control) milling machines or some other suitable part forming technique. The interior guide surfaces 28, 30 may also be heat treated with a line-of-sight heat treatment procedure such as plasma vapor deposition (PVD). Having full access to the interior guide surfaces 28, 30-something that is not generally available with a single-piece loading funnel-makes a wide range of precision milling and heat-treatment procedures, like those just mentioned, practical and available for preparing the interior guide surfaces 28, 30. The ability of the split loading funnel 10 to assume a multitude of sizes and shapes for the guide passage 38 also means that different sized loading funnels do not have to be stocked and maintained.

Figure 7:
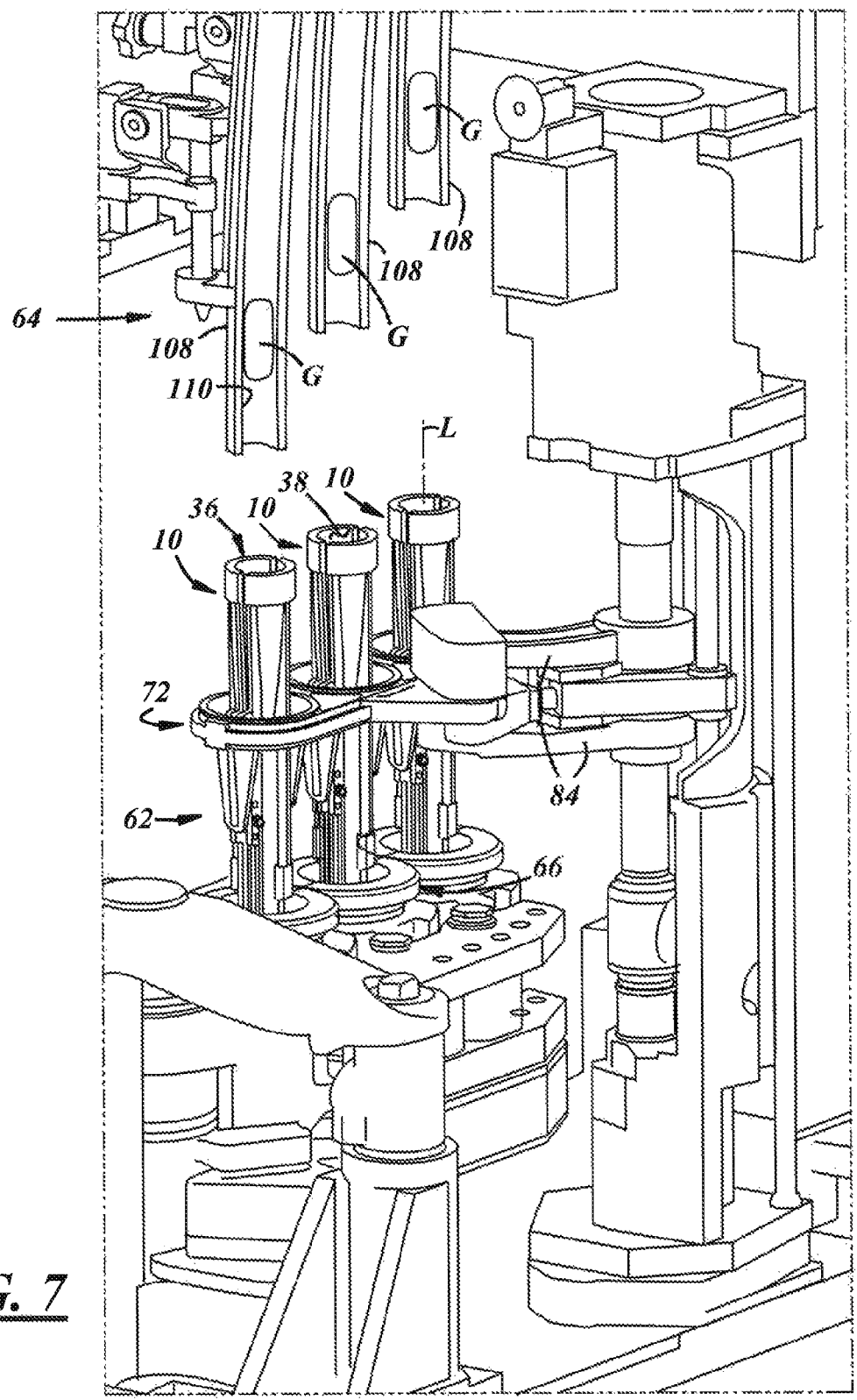
FIG. 7 is a perspective view of an apparatus for delivering a molten glass gob from a gob delivery system into a blank mold of an individual section glass forming machine in accordance with an illustrative embodiment of the present disclosure.

FIG. 7 depicts an apparatus 62 for delivering molten glass gobs G from a gob delivery system 64 into blank molds 66 of an individual section glass forming machine. The apparatus 62 delivers the gobs G into the blank molds 66 via one or more of the split loading funnels 10 described above. Other embodiments of the apparatus 62 can, of course, include more or less than the illustrated three split loading funnels and can even include one or more conventional single-piece loading funnels in combination with one or more of the split loading funnels 10. The apparatus 62 includes a funnel holder 72 that is configured to hold the three split loading funnels 10 in a vertically-aligned position above mold cavities of one or more corresponding blank molds 66.

Referring now to FIG. 8, the funnel holder 72 includes a body 74 that defines one or more circular openings 76. An axially extending cylindrical portion or radial ledge 78 having a top surface 80 is preferably disposed about the circumference of each opening 76. The body 74 further includes one or more radially extending portions or bearing flanges 82 that operatively connect the body 74 to one or more bearing arms 84, shown in FIG. 7, that can be actuated to reciprocally move the body 74—and thus the split loading funnels 10 held by the body 74—up or down in the vertical direction and/or to swing the body 74 in a plane generally transverse to that direction. The term "vertical direction" as used here refers to a direction parallel to the longitudinal axis L of the guide passages 38 of the split loading funnels 10. The funnel holder 72 also includes one or more set screws 75 that may extend radially through the flange 82.

With continuing reference to FIG. 8, a funnel mount 86 may be rotatably received in a corresponding opening 76 of the funnel holder 72. The funnel mount 86 has a circular frame 88 that fits within the opening 76 defined in the holder body 74 and a pair of opposed, spaced apart legs 90 depending from the frame 88. The circular frame 88 includes an upper circumferential lip 91 that has a bottom surface 92 that mates with the top surface 80 of the ledge 78. The two mating surfaces 80, 92 prevent the funnel mount 86 from falling through the opening 76 in the body 74 but do not prevent rotation of the funnel mount 86 relative to the body 74. The frame 88 may include circumferentially extending reliefs 89 in a radially outward surface thereof to accept the set screws 75. The opposed legs 90 that depend from the circular frame 88 include a shoulder 94 and pair of elongated ridges 96 that define a vertical groove 98 extending downwardly from the shoulder 94 (FIG. 9).

With respect to FIG. 9, the split loading funnel 10 is carried by the funnel holder 72, for example, by being received in the funnel mount 86. Here, in this embodiment, the protruding vertical guides 58 of the blocks 48 are registered and slid vertically downward within with the vertical grooves 98 of the depending legs 90 of the funnel mount 86 until the stops 60 of the blocks 48 engage the horizontal shoulders 94, as shown in FIG. 9.

With reference to FIG. 1, when so received, the inlet 36 of the split loading funnel 10 is positioned above the funnel holder 72, the outlet 42 of the split loading funnel 10 is positioned below the funnel holder 72, and any rotation of the funnel mount 86 relative to the funnel holder 72 will also correspondingly rotate the split loading funnel 10 relative to the funnel holder 72 by substantially the same amount.

Indeed, to help achieve accurate rotation of the split loading funnel 10 as needed to properly orient the guide passage 38 with the trajectory path of a gob being introduced from the gob delivery system 64 (FIG. 7), a top surface 102 of the upper circumferential lip 91 of the funnel mount 86 may include an indicator 104 (e.g., a notch, indicia, or any other suitable feature) that can be indexed to corresponding registration indicators 106 located on the funnel holder 72, for example, circumferentially spaced apart around the flange 82. Once the funnel mount 86 is located in a desired position with respect to the funnel holder 72, the set screws 75 can be used to secure the funnel mount 86 to the funnel holder 72.

The funnel mount 86 may serve a variety of purposes. First, as just described, it facilitates indexed rotation of the split loading funnel 10 so that the guide passage 38 can be oriented to accommodate anticipated variances in the trajectory path of the gob G. Second, the funnel mount 86 offers a simple and convenient way to load and unload the split loading funnels 10. If the funnel 10 happens to become plugged or needs to be removed for any reason, such as if the funnel 10 needs to be substituted for another sized/shaped funnel 10, the funnel 10 currently in use can simply be lifted out of the funnel mount 86 and replaced with another one independently from the other funnels 10 held by the funnel holder 72.

Referring back to FIG. 7, operation of the apparatus 62 involves positioning the funnel holder 72 with respect to the blank molds 66 so that the outlets 42 (FIG. 1) of the guide passages 38 of the three split loading funnels 10 are aligned with, and inserted partially into, the molds 66. Gobs G of molten glass are delivered from the gob delivery system 64 to the guide passages 38 of the split loading funnels 10. The gobs G are formed in known fashion by shearing a stream of molten glass as it exits the forehearth of a glass furnace (not shown). Deflectors 108 are arranged at the end of the gob delivery system 64 in correspondence with the split loading funnels 10 to direct the gobs G vertically into the funnels 10 by way of chutes 110.

With reference to FIG. 11, the chutes 110 have bases 112 and side walls 114 extending outwardly from the bases 112. The side walls 114 may be disposed at a non-zero open angle with respect to a chute axis C. For example, the side walls 114 may be disposed at a 10-14 degree (e.g. 12 degree) included angle with respect to the axis C. Dimension A, which extends between the parallel side walls 114, is typically referred to as the side-to-side direction. Dimension B, which extends perpendicular to the side-to-side direction A, is typically referred to as the in-out direction.

With reference to FIG. 7, the guide passages 38 of the split loading funnels 10 are preferably indexed to the chutes 110 of the deflectors 108. Such indexing is accomplished by rotating the split loading funnels 10 via rotation of the funnel mounts 86 so that the interior guide surfaces 28, 30 of the guide passage 38 are perpendicular to the in-out direction B. Indexing the split loading funnels 10 in this way allows variances in the gob trajectory path, which have been found to be more pronounced in the in-out direction B than in the side-to-side direction A, to be more tightly controlled upon entry of the gob G into the guide passage 38.

The gobs G of molten glass enter the guide passages 38 at the inlets 36 and pass through the guide passages 38 along their longitudinal axes L. The gobs G are gently guided through the guide passages 38 and have spare room to grow, distort, wiggle, etc., and eventually exit the guide passages 38 through the outlets 42 (FIG. 1).

With reference to FIGS. 12A-12C, the blank molds 66 may include mold halves 66a, 66b that, when closed, define a mold cavity 68. Upon exiting the funnels 10, the gobs G fall into mold cavities 68 of the blank molds 66, past baffle matches 69 and past waists 70 without touching same. The previously discussed inscribed diameters of the funnels 10 are preferably smaller than the corresponding diameter of the waists 70. The split loading funnels 10 are then retracted out of the mold cavities 68. Next, baffles 116 (FIG. 12B) are brought into registry with the mold cavities 68 to close them, and the gobs G are formed into parisons P (FIG. 12C) by the press-and-blow method, the blow-and-blow method, or some other suitable method, as is generally known in the art. Once the parison P is formed, the baffles 116 (FIG. 12B) are removed, the blank molds 66 are opened, the parisons P are taken to another portion of the individual section machine, the split loading funnels 10 are brought back into inserted alignment with the mold cavities 68, and the process repeats itself.

Figure 13:
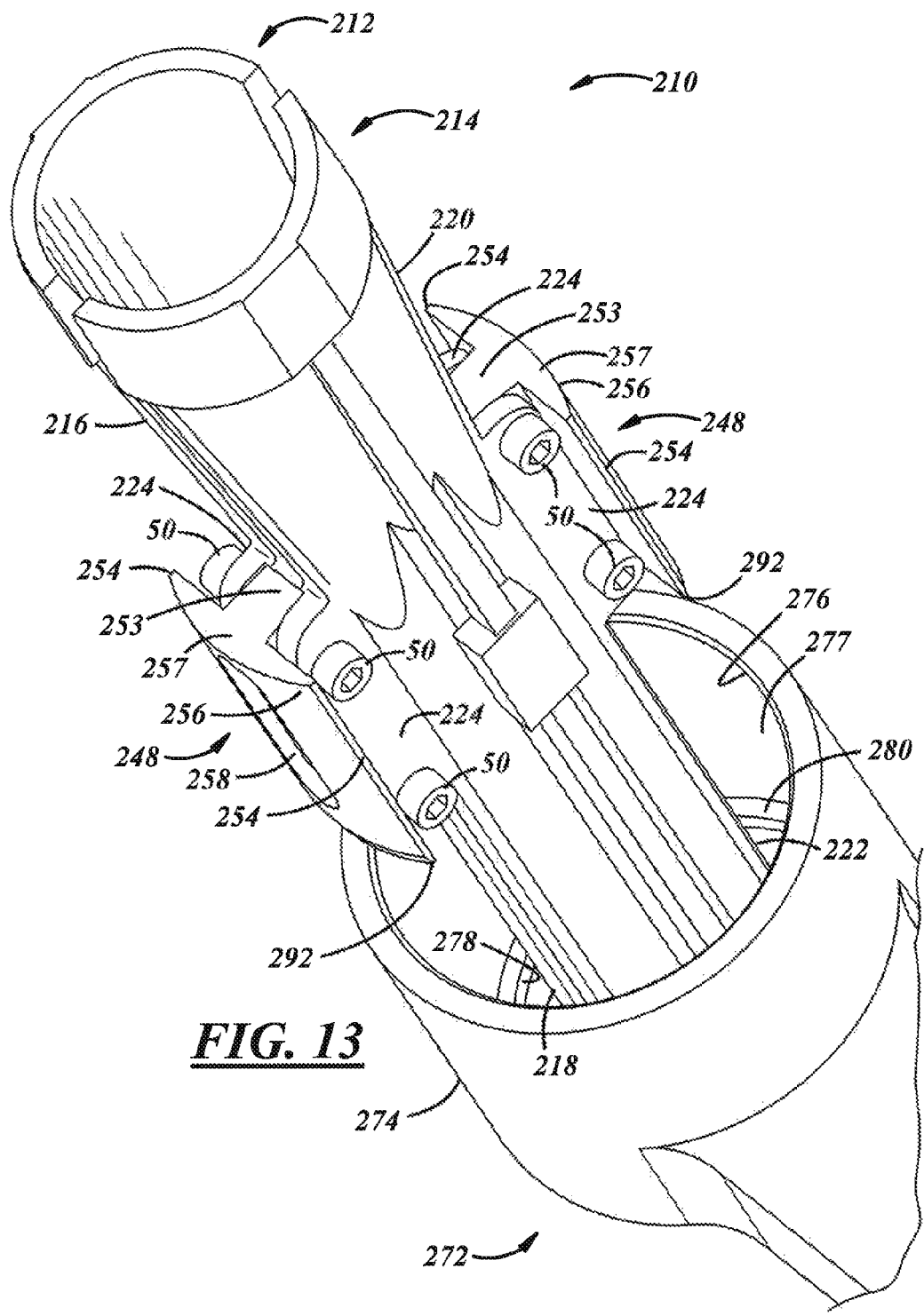
FIG. 13 is an exploded, fragmentary, perspective view of a funnel and funnel holder according to another illustrative embodiment.
Figure 14:
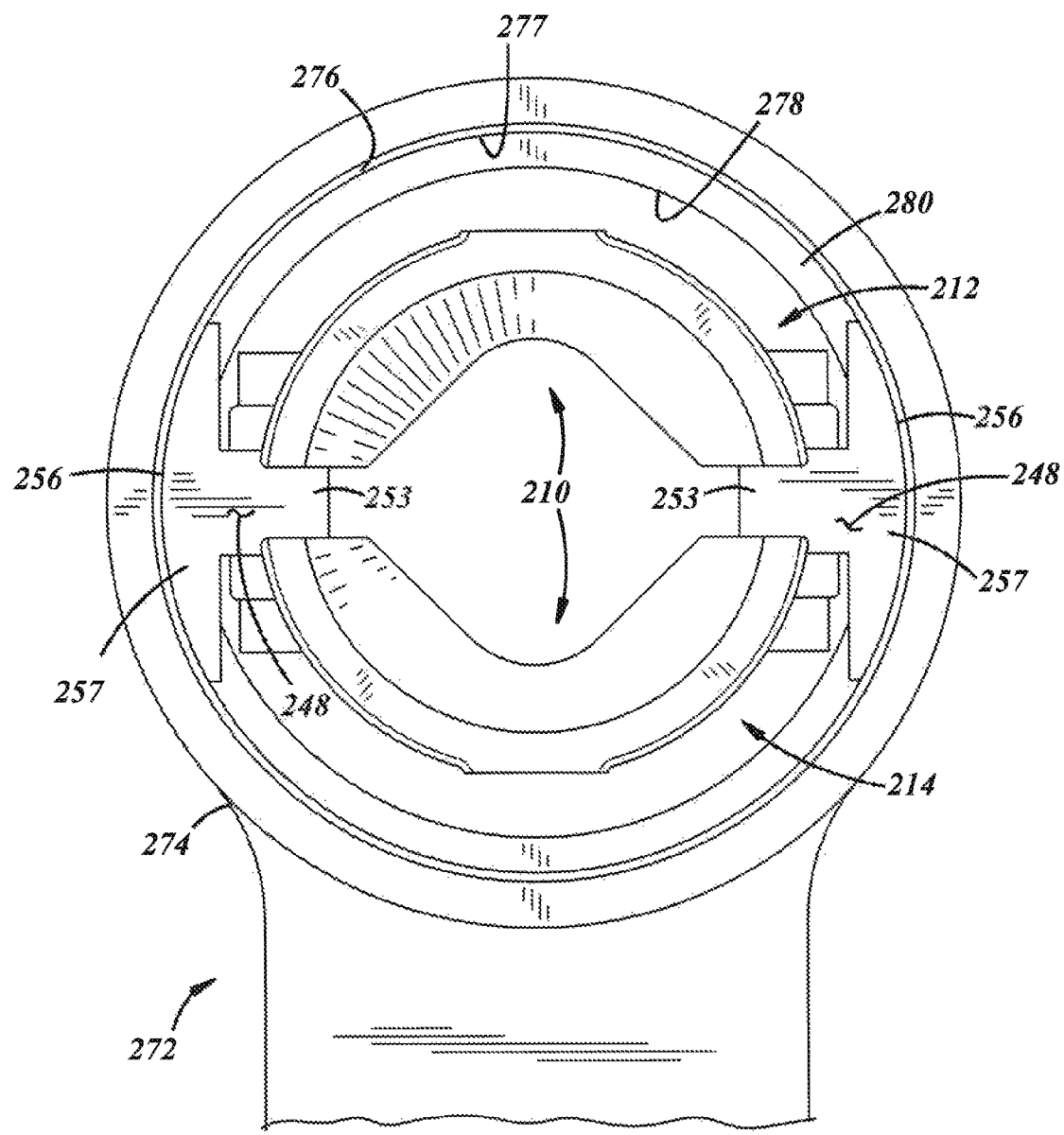
FIG. 14 is a top view of the funnel and funnel holder of FIG. 13, as assembled together.

FIGS. 13 and 14 illustrate another illustrative embodiment of a split loading funnel 210. This embodiment is similar in many respects to the embodiment of FIGS. 1-12C and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

With reference to FIG. 13, the split loading funnel 210 includes a first funnel segment 212 and a second funnel segment 214. The first funnel segment 212 has an upper portion 216 and a lower portion 218, and the second funnel segment 214 has an upper portion 220 and a lower portion 222. The funnel segments 212, 214 additionally include lateral flanges 224 extending from sides of the segments 212, 214. The lateral flanges 224 may carry fasteners 50 therethrough.

The funnel segments 212, 214 are coupled together in this embodiment by mounting blocks 248, and the fasteners 50. Accordingly, the funnel 210 includes the segments 212, 214, and the blocks 248 for adjusting the segments 212, 214 with respect to each other. The blocks 248 may be generally T-shaped, as illustrated, or may be of any other suitable shape(s). The mounting blocks 248 may include generally rectangular portions 253 positioned between the opposed confronting lateral flanges 224 of the two funnel segments 212, 214, and semi-cylindrical portions 257 extending from radially outward ends of the rectangular portions 253 and that may axially and circumferentially overlap the flanges 224. Either or both of the rectangular portions 253 or the flanges 224 may have surfaces tapered in a longitudinal direction to change the angle of interior guide surfaces of the funnel 210 with respect to its longitudinal axis. The mounting blocks 248 further include semi-cylindrical, radially outwardly-facing mounting surfaces 256 extending between side surfaces 254. The outwardly-facing mounting surfaces 256 of the blocks 248 may include axially extending reliefs 258 that may be used as locating features or for any other suitable purpose.

With reference to FIGS. 13 and 14, the funnel 210 may be carried by a funnel holder 272 that includes a body 274 defining one or more circular passages or openings 276. The body 274 includes a radially inwardly extending ledge 278 disposed about the circumference of the opening 276 adjacent a bottom end of the body 274 and having a top surface 280. The funnel 210 may be carried in the opening 276 such that axially facing locating surfaces 292 (FIG. 13) of the semi-cylindrical portions 257 of the blocks 248 locate against the top surface 280 of the ledge 278. Also, as illustrated in FIG. 14, the mounting surfaces 256 may be located against an interior cylindrical surface 277 of the funnel holder body 274, wherein the funnel 210 is rotatable within the body 274. Although not illustrated, the funnel holder 272 may include set screws or any other suitable locating features to cooperate with the reliefs 258 (FIG. 13) to set the funnel 210 in any desired location.

Another embodiment of the present disclosure includes a process for delivering a gob of molten glass from a gob delivery system to a blank mold. The process includes providing an apparatus that includes a split, rotatable, loading funnel carried by a funnel holder and having two or more individual funnel segments that are arranged relative to one another to cooperatively define a guide passage having a longitudinal axis. The process also includes locating the split loading funnel above a mold cavity of a blank mold so that the guide passage is vertically aligned with the mold cavity. The process further includes delivering a gob of molten glass from a deflector to the mold cavity through the guide passage of the split loading funnel, the deflector having a chute that includes a base and two side walls extending outwardly from the base. The process additionally includes moving the split loading funnel away from the mold cavity after the gob of molten glass has been introduced to the mold cavity.

There thus has been disclosed a split loading funnel and an apparatus and process for delivering a gob of molten glass to a blank mold that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A split loading funnel for guiding a gob of molten glass that includes:
   two or more individual funnel segments coupled together by mounting blocks, each of the individual funnel segments including an upper portion and a lower portion, the upper portions of the individual funnel segments together providing an inlet having an entrance plane, and the lower portions of the individual funnel segments together providing an outlet having an exit plane, wherein each of the lower portions of the individual funnel segments has a concave interior guide surface, and wherein a mounting block is secured between each pair of circumferentially adjacent lower portions of the two or more individual funnel segments to position the interior guide surfaces relative to one another such that the interior guide surfaces cooperate to define a guide passage extending along a longitudinal axis and terminating at the outlet.

2. The split loading funnel set forth in claim 1, wherein the two or more individual funnel segments comprise a first funnel segment with a first concave interior surface and a second funnel segment with a second concave interior surface.

3. The split loading funnel set forth in claim 1, wherein the split loading funnel comprises:
   a first funnel segment that includes a lower portion and a lateral flange extending from each side of the lower portion, wherein the lower portion of the first funnel segment has a first concave interior guide surface;
   a second funnel segment that includes a lower portion and a lateral flange extending from each side of the lower portion, wherein the lower portion of the second funnel segment has a second concave interior guide surface; and
   a pair of mounting blocks, one of the mounting blocks securing one of the lateral flanges extending from the lower portion of the first funnel segment to one of the lateral flanges extending from the lower portion of the second funnel segment, and the other of the mounting blocks securing the other lateral flange extending from the lower portion of the first funnel segment to the other lateral flange extending from the lower portion of the second funnel segment.

4. The split loading funnel set forth in claim 3, wherein the first concave interior guide surface has a cross-sectional profile and the second concave interior guide surface has a cross-sectional profile.

5. The split loading funnel set forth in claim 4, wherein the cross-sectional profiles of the first and second concave interior guide surfaces are the same.

6. The split loading funnel set forth in claim 4, wherein the cross-sectional profiles of the first and second concave interior guide surfaces are different.

7. The split loading funnel set forth in claim 3, wherein the first funnel segment further includes a upper portion having a first concave interior surface angled outwardly from the first concave interior guide surface, wherein the second funnel segment further includes a upper portion having a second concave interior surface angled outwardly from the second concave interior guide surface, and wherein the first and second concave interior surfaces of the upper portions face each other to define the inlet that communicates with the, guide passage defined by the lower portions of the first and second funnel segments.

8. The split loading funnel set forth in claim 7, wherein the mounting blocks are tapered along their lengths to angle the first and second interior guide surfaces towards one another so that the cross-sectional area of the guide passage varies down the longitudinal axis.

9. The split loading funnel set forth in claim 3, wherein each of the pair of mounting blocks is tapered to angle the first and second interior guide surfaces towards one another so that the cross-sectional area of the guide passage progressively decreases down the longitudinal axis of the guide passage towards the outlet.

10. The split loading funnel set forth in claim 1, wherein the interior guide surfaces of the multiple individual funnel segments are heat-treated or coated to provide wear resistance, limit heat transfer, or lower friction.

11. A glassware forming machine that includes:
    a blank mold for forming a molten glass gob into a glass parison;
    a split loading funnel positioned above said blank mold to guide the molten glass gob into said blank mold, the split loading funnel comprising two or more individual funnel segments coupled together by mounting blocks, each of the individual funnel segments including an upper portion and a lower portion, the upper portions of the individual funnel segments together providing an inlet with an entrance plane through which the molten glass gob is received in the split loading funnel, and the lower portions of the individual funnel segments together providing an outlet having an exit plane through which the molten glass gob leaves the split loading funnel, wherein each of the lower portions of the individual funnel segments has a concave interior guide surface, and wherein a mounting block is secured between each pair of circumferentially adjacent lower portions of the two or more individual funnel segments to position the interior guide surfaces relative to one another such that the interior guide surfaces cooperate to define a guide passage that terminates at the outlet of the split loading funnel.

12. The machine set forth in claim 11, wherein the split loading funnel comprises:
   a first funnel segment that includes a lower portion and a lateral flange extending from each side of the lower portion, wherein the lower portion of the first funnel segment has a first concave interior guide surface;
   a second funnel segment that includes a lower portion and a lateral flange extending from each side of the lower portion, wherein the lower portion of the second funnel segment has a second concave interior guide surface; and
   a pair of mounting blocks, one of the mounting blocks securing one of the lateral flanges extending from the lower portion of the first funnel segment to one of the lateral flanges extending from the lower portion of the second funnel segment, and the other of the mounting blocks securing the other lateral flange extending from the lower portion of the first funnel segment to the other lateral flange extending from the lower portion of the second funnel segment.

13. The apparatus set forth in claim 12, wherein a cross-sectional profile of the first concave interior guide surface and a cross-sectional profile of the second concave interior guide surface are different.

* * * * *